(12) United States Patent
Russell

(10) Patent No.: US 8,508,672 B2
(45) Date of Patent: Aug. 13, 2013

(54) SYSTEM AND METHOD FOR IMPROVING VIDEO IMAGE SHARPNESS

(75) Inventor: Andrew I. Russell, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1640 days.

(21) Appl. No.: 11/616,920

(22) Filed: Dec. 28, 2006

(65) Prior Publication Data

US 2008/0158431 A1    Jul. 3, 2008

(51) Int. Cl.
*H04N 3/22* (2006.01)
*H04N 3/26* (2006.01)

(52) U.S. Cl.
USPC ........... 348/745; 348/712; 348/571; 348/625; 348/711; 348/744; 348/317; 348/663; 348/631; 348/609; 348/430.1; 348/456; 348/490; 348/750; 345/694; 382/263; 353/31; 353/84

(58) Field of Classification Search
USPC ............... 348/745, 712, 571, 625, 750, 744, 348/711, 430.1, 456, 490, 663, 631, 609; 345/694; 382/263; 353/31, 84
See application file for complete search history.

(56) References Cited

U.S. PATENT DOCUMENTS

| | | | |
|---|---|---|---|
| 4,956,619 A | 9/1990 | Hornbeck | |
| 6,115,083 A | 9/2000 | Doherty et al. | |
| 7,860,327 B2 * | 12/2010 | Gunatilake | 382/236 |
| 8,289,454 B2 * | 10/2012 | Hasegawa et al. | 348/687 |
| 2002/0047824 A1 * | 4/2002 | Handschy et al. | 345/97 |
| 2003/0231260 A1 * | 12/2003 | Pate et al. | 348/744 |
| 2004/0140972 A1 * | 7/2004 | Hirota et al. | 345/204 |
| 2005/0265627 A1 * | 12/2005 | Yamauchi | 382/275 |
| 2006/0290625 A1 * | 12/2006 | Sugimoto | 345/83 |
| 2008/0024683 A1 * | 1/2008 | Damera-Venkata et al. | 348/744 |

* cited by examiner

*Primary Examiner* — Jefferey Harold
*Assistant Examiner* — Mustafizur Rahman
(74) *Attorney, Agent, or Firm* — Warren L. Franz; Wade J. Brady, III; Frederick J. Telecky, Jr.

(57) ABSTRACT

A system for, and method of, improving video image sharpness and a continuous-light-emitting video display system employing the system or the method. In one embodiment, the system for improving video image sharpness includes: (1) a sub-frame generator configured to receive a frame of a video image and generate plural sub-frames therefrom and (2) a spatial filter, associated with the sub-frame generator and configured to cause the plural sub-frames to be spatially filtered with respect to one another based on a display sequence thereof.

12 Claims, 5 Drawing Sheets

SYSTEM AND METHOD FOR IMPROVING VIDEO IMAGE SHARPNESS

TECHNICAL FIELD OF THE INVENTION

The invention is directed, in general, to visual displays and, more particularly, to a system and method for improving video image sharpness, particularly with respect to video images to be displayed on continuous-light-emitting video displays, such as digital micro-mirror devices (DMDs).

BACKGROUND OF THE INVENTION

Several modern display technologies are used to display moving, or "video," images, such as liquid-crystal displays (LCDs) (which are suitable for either front or rear projection or direct view), DMDs (which are suitable for either front or rear projection as part of a spatial light modulator, or SLM, -based projector system) or plasma displays (which are suitable only for direct view). These display technologies differ fundamentally from the traditional cathode ray tube (CRT) in that they emit light continuously while displaying a single video frame. In contrast, a CRT emits a short burst of light once per video frame with intervening periods of relative darkness. Though the duration of the burst of light is short, its intensity is very high, so a CRT is capable of producing bright images despite the short duration of the burst of light.

In continuous-light-emitting video displays, the continuous emission of light can lead to significant degradation of video image quality. Motion of objects in the video image causes adjacent video frames to contain different images, resulting in the blurring of images, particularly at their edges. The image degrades as a direct function of the speed of the motion. Past some point, the objects moving in the image can no longer be discerned.

One prior art technique for reducing this blurring of the image involves generating and displaying interpolated images for each video frame. Unfortunately, generating interpolated images requires significant computation and storage capability and thus adds substantial complexity and cost to any device having that capability.

What is needed in the art is a way to increase the sharpness of a video image that requires less computation and storage capability than does interpolation of images. What is needed in the art is a way to increase the sharpness of a video image without having to compare adjacent frames. More generally, what is needed in the art is a way to process the frames of a video image such that they are perceived as being sharper when they are displayed on a continuous-light-emitting video display.

SUMMARY OF THE INVENTION

To address the above-discussed deficiencies of the prior art, the invention provides, in one aspect, a system for improving video image sharpness. In one embodiment, the system for improving video image sharpness includes: (1) a sub-frame generator configured to receive a frame of a video image and generate plural sub-frames therefrom and (2) a spatial filter, associated with the sub-frame generator and configured to cause the plural sub-frames to be spatially filtered with respect to one another based on a display sequence thereof.

In another aspect, the invention provides a method of improving video image sharpness. In one embodiment, the method includes: (1) generating plural sub-frames from a received frame of a video image, (2) spatially filtering the plural sub-frames with respect to one another based on a display sequence thereof and (3) providing the plural sub-frames to a bit plane formatter.

In yet another aspect, the invention provides a continuous-light-emitting video display system. In one aspect, the continuous-light-emitting video display system includes: (1) a processing system configured to convert a received image signal into video frames, (2) a frame store/format module coupled to the processing system and configured to convert the video frames into bit planes, (3) a continuous-light-emitting video display coupled to the frame store/format module and (4) a sequence controller coupled to the frame store/format module and configured to deliver the bit planes to the continuous-light-emitting video display according to an order. The frame store/format module contains a system for improving video image sharpness that includes: (1) a sub-frame generator configured to receive a frame of a video image and generate plural sub-frames therefrom and (2) a spatial filter, associated with the sub-frame generator and configured to cause the plural sub-frames to be spatially filtered with respect to one another based on a display sequence thereof, the display sequence causing the plural sub-frames to be ordered in terms of increasing sharpness and a subsequent portion of the display sequence causes the plural sub-frames to be ordered in terms of decreasing sharpness.

The foregoing has outlined preferred and alternative features of the invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
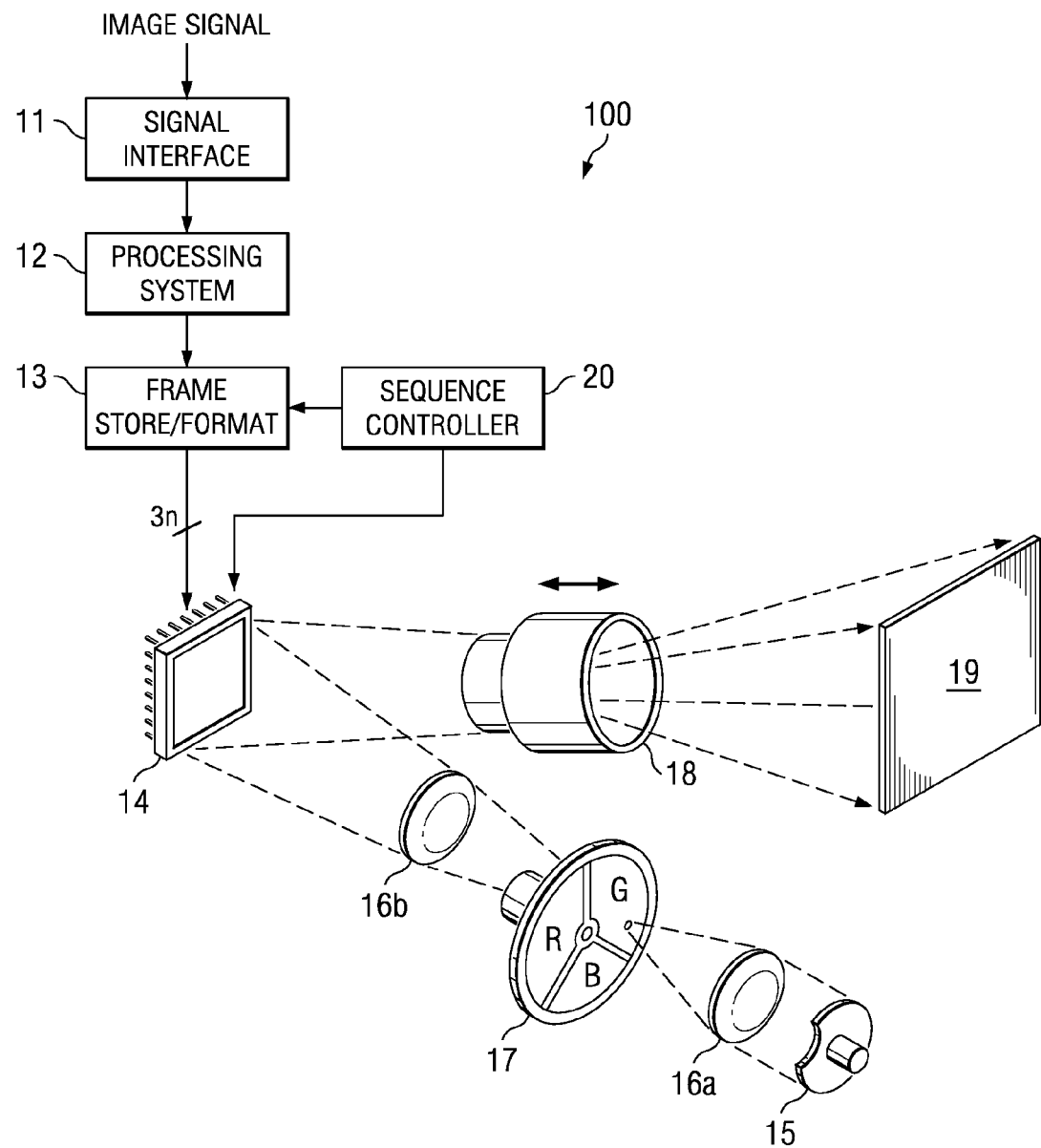
FIG. 1 illustrates one embodiment of a projection visual display system, which is one type of continuous-light-emitting video display and which uses an SLM having a DMD therein to generate real-time images from an input image signal.

FIG. 1 illustrates one embodiment of a projection visual display system 100, which is one type of continuous-light-emitting video display and uses an SLM having a DMD 14 therein to generate real-time images from an input image signal. The input image signal may be from a television tuner, Motion Picture Experts Group (MPEG) decoder, video disc player, video cassette player, personal computer (PC) graphics card or the like. Only those components significant to main-screen pixel data processing are shown. Other components, such as might be used for processing synchronization and audio signals or secondary screen features, such as closed captioning, are not shown for simplicity's sake.

A white light source 15 shines (typically white) light through a concentrating lens 16a, a color wheel 17 and a collimating lens 16b. The light, now being colored as a function of the position of the color wheel 17, reflects off a DMD 16 and through a lens 18 to form an image on a screen 19.

In the illustrated embodiment, the input image signal, which may be an analog or digital signal, is provided to a signal interface 11. In embodiments where the input image signal is analog, an analog-to-digital (A/D) converter (not illustrated) may be employed to convert the incoming signal to a digital data signal. The signal interface 11 receives the data signal and separates video, synchronization and audio signals. In addition, a Y/C separator is also typically employed, which converts the incoming data from the image signal into pixel-data samples, and which separates luminance (Y) data from chrominance (C) data, respectively. Alternatively, in other embodiments, Y/C separation could be performed before A/D conversion.

The separated signals are then provided to a processing system 12. The processing system 12 prepares the data for display by performing various pixel data processing tasks. The processing system 12 may include whatever processing components and memory useful for such tasks, such as field and line buffers. The tasks performed by the processing system 12 may include linearization (to compensate for gamma correction), colorspace conversion, and interlace to progressive scan conversion. The order in which any or all of the tasks are performed by the processing system 12 may vary.

Once the processing system 12 is finished with the data, a frame store/format module 13 receives processed pixel data from the processing system 12. The frame store/format module 13 formats the data, on input or on output, into bit plane format for delivery to the DMD 14. The bit plane format permits single or multiple pixels on the DMD 14 to be turned on or off in response to the value of one bit of data, in order to generate one layer of the final display image. In one embodiment, the frame store/format module 13 is a "double buffer" memory, which means that it has a capacity for at least two display frames. In such a module, the buffer for one display frame may be read out to the SLM while the buffer for another display frame is being written. To this end, the two buffers are typically controlled in a "ping-pong" manner so that data is continually available to the SLM.

The bit plane data from the frame store/format module 13 is eventually delivered to the SLM. Although this description is in terms of an SLM having a DMD 14 (as illustrated), other types of SLMs could be substituted into the display system 100. Details of an SLM that may be employed with various embodiments of the system described herein are set out in U.S. Pat. No. 4,956,619, entitled "Spatial Light Modulator." In the case of the illustrated DMD-type SLM, each piece of the final image is generated by one or more pixels of the DMD 14, as described above. Generally, the SLM uses the data from the frame store/format module 13 to address each pixel on the DMD 14. The "ON" or "OFF" state of each pixel forms a black or white piece of the final image, and an array of pixels on the DMD 14 is used to generate an entire image frame. Each pixel displays data from each bit plane for a duration proportional to each bit's PWM weighting, which is proportional to the length of time each pixel is ON, and thus its intensity in displaying the image. In the illustrated embodiment, each pixel of the DMD 14 has an associated memory cell to store its instruction bit from a particular bit plane.

For each frame of the image to be displayed in color, red, green, blue (RGB) data may be provided to the DMD 14 one color at a time, such that each frame of data is divided into red, blue and green data segments. Typically, the display time for each segment is synchronized to an optical filter, such as the color wheel 17, which rotates so that the DMD 14 displays the data for each color through the color wheel 17 at the proper time. Thus, the data channels for each color are time-multiplexed so that each frame has sequential data for the different colors.

In an alternative embodiment, the bit planes for different colors could be concurrently displayed using multiple SLMs, one for each color component. The multiple color displays may then be combined to create the final display image on the screen 19. Of course, a system or method employing the principles disclosed herein is not limited to either embodiment.

Also illustrated in FIG. 1 is a sequence controller 20 associated with the frame store/format module 13 and the DMD 14. The sequence controller 20 provides reset control signals to the DMD 14, as well as load control signals to the frame store/format module 13. An example of a suitable sequence controller is described in U.S. Pat. No. 6,115,083, entitled "Load/Reset Sequence Controller for Spatial Light Modulator."

As stated above, the perceived sharpness of a moving image displayed by a continuous-light-emitting video display, such as the SLM system of FIG. 1, may be increased. A fundamental and novel recognition is involved: that the spatial frequency content of adjacent images is a significant cause of perceived blurriness or sharpness in a video image. More particularly, it has been recognized that relatively high spatial frequencies (those typically concerning textures, details and edges) in adjoining frames create the perception of blurriness when they are displayed temporally proximate one another.

Based on these recognitions, a novel way to improve the perceived sharpness of a video image is to display spatial-frequency components of each frame of the video image in spatial-frequency-order. For each frame, lowest spatial-frequency (least sharp) content is introduced first, followed by higher spatial-frequency (sharper) content, followed by the highest spatial-frequency (sharpest) content. Following this logic, the content of each frame may be removed in spatial-frequency-order, too, starting with the highest spatial-frequency content and ending with the lowest spatial-frequency content.

In the context of a 60 fps video image, the lowest spatial-frequency content of a first ($\frac{1}{60}^{th}$ second) frame is displayed, followed by ever-increasing spatial-frequency content, culminating in the highest spatial-frequency content, followed by removal of the highest spatial-frequency content, ever decreasing spatial-frequency content and finally the lowest spatial-frequency content, all over the duration of 1/60th of a second. Then the second frame is displayed the same as was the first, and so on. In this way, the highest spatial-frequency content of each frame is confined to the center of each frame display time; the highest spatial-frequency contents of adjacent frames are not displayed temporally proximate one another. When motion occurs, the lower-frequency content is subject to more blurring. However, since they are already blurry (being low-frequency) additional blurring has only minimal effect. The details (high spatial-frequencies) of the video image are not blurred, since they are confined to the center of each frame and therefore localized in time.

Figure 2:
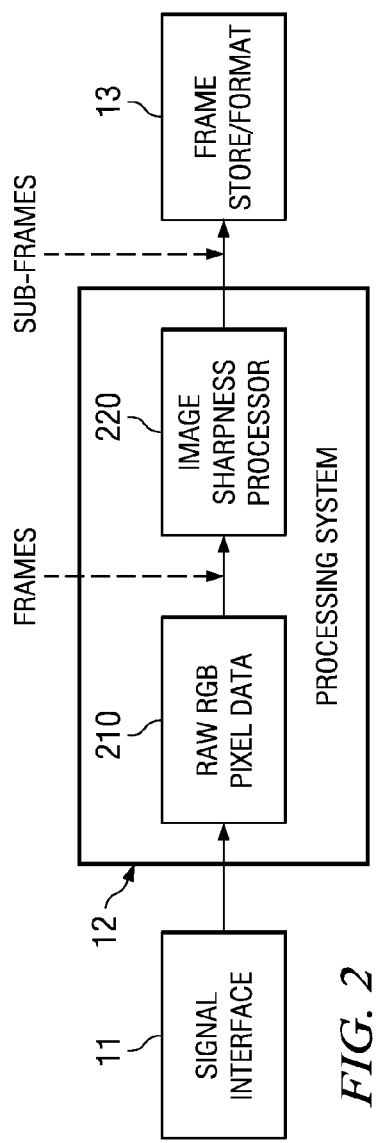
FIG. 2 is a block diagram of one embodiment of the processing system of FIG. 1 constructed according to the principles of the invention.

FIG. 2 is a block diagram of one embodiment of the processing system 12 of FIG. 1 constructed according to the principles of the invention. The signal interface 11 provides frames of raw RGB pixel data 210 to an image sharpness improver 220, which incorporates one or both of a system and method for improving video image sharpness. In response, the image sharpness improver 220 provides plural sub-frames for each incoming frame in a manner that will be described in detail below. The sub-frames are provided to the frame store/format module 13, where they are transformed into bit planes for storage and subsequent provision to, e.g., the DMD 14 of FIG. 1.

Figure 3:
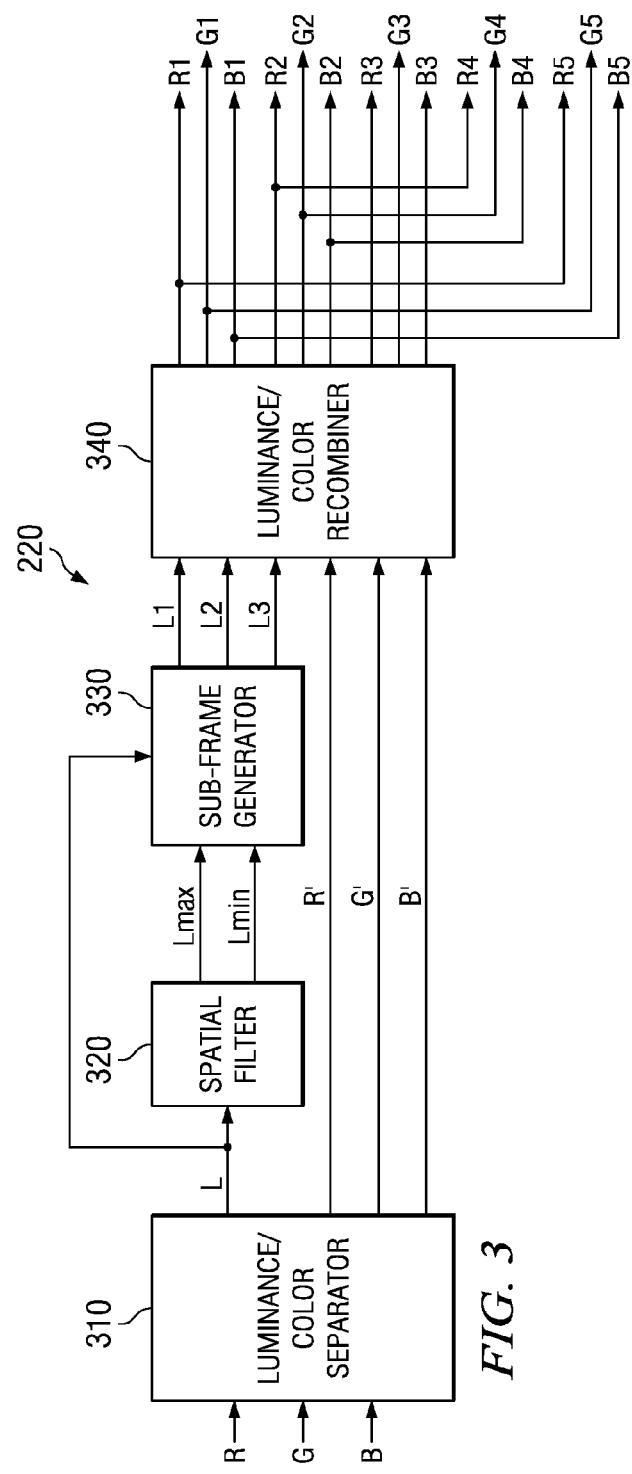
FIG. 3 illustrates a block diagram of one embodiment of a system for improving video image sharpness contained in the image sharpness improver of FIG. 2 and constructed according to the principles of the invention.

FIG. 3 illustrates a block diagram of one embodiment of a system for improving video image sharpness contained in the image sharpness improver of FIG. 2 and constructed according to the principles of the invention. A luminance/color separator 310 receives and separates raw RGB pixel data into a luminance, or "luma," component containing only luminance information and R', G' and B' chrominance, or "chroma," components containing only color information as shown. The illustrated embodiment of the luminance/color separator 310 produces L, R', G' and B' from R, G and B thus:

$L=\max(R,G,B),$ $R'=R/L,$ $G'=G/L,$ and $B'=B/L.$

R', G' and B' are not needed until they are recombined with the luminance component.

L, on the other hand, is provided to a spatial filter 320 and a sub-frame generator 330. In general, the sub-frame generator 330 is configured to receive a frame (that lacks color information in the illustrated embodiment) of a video image and generate therefrom plural sub-frames. The spatial filter 320 is configured to cause the plural sub-frames to be spatially filtered with respect to one another based on a display sequence thereof.

More specifically, the spatial filter calculates maximum and minimum luminance components (Lmax and Lmin) from L for each frame and provides Lmax and Lmin to the sub-frame generator 330 as shown. To illustrate one example of how Lmax and Lmin may be computed, FIG. 4A is a block diagram of one embodiment of the spatial filter of FIG. 3 constructed according to the principles of the invention, and FIG. 4B is a graph showing one technique for deriving Lmax and Lmin from L.

Figures 4A, 4B:
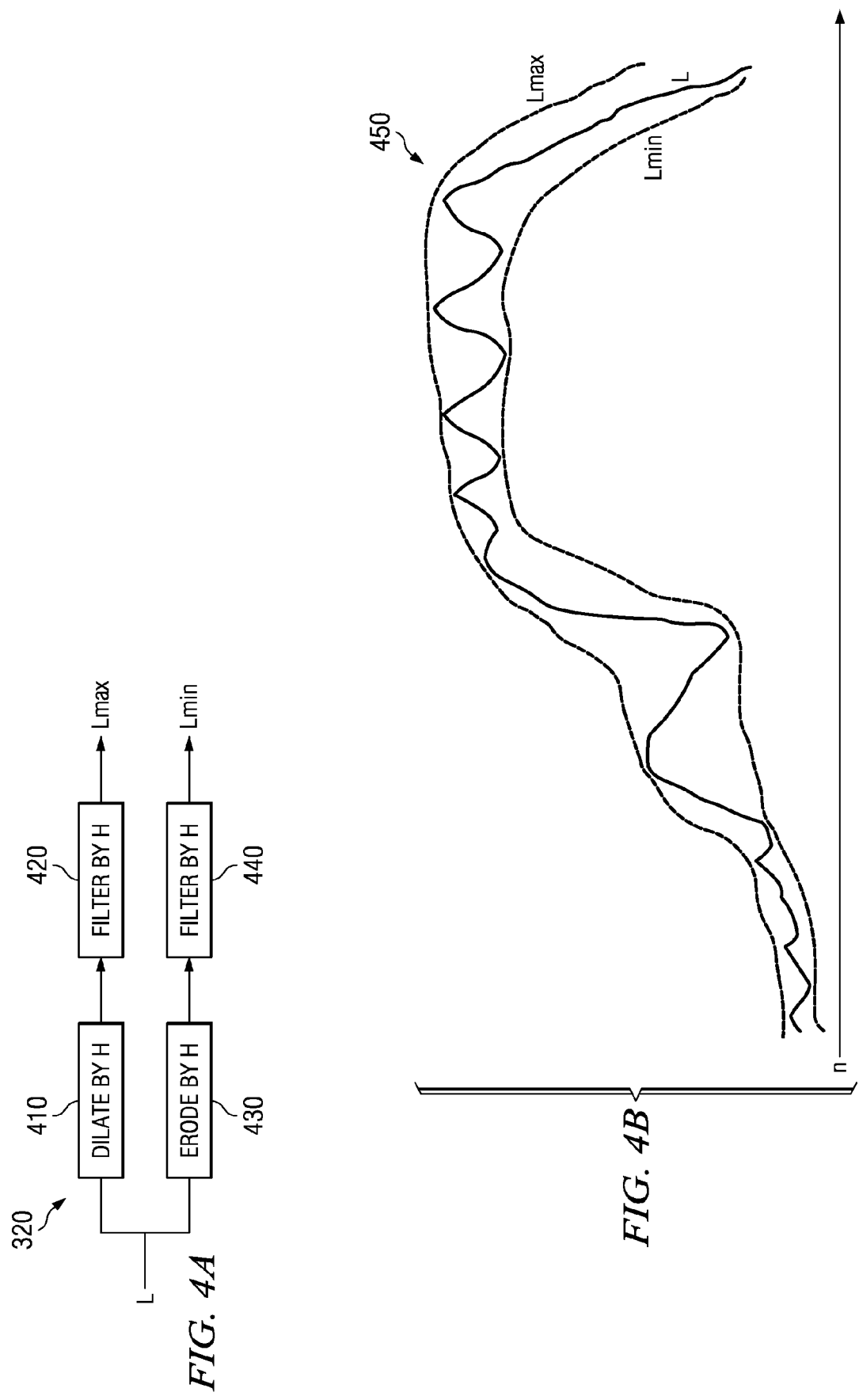
FIG. 4A illustrates a block diagram of one embodiment of the spatial filter of FIG. 3 constructed according to the principles of the invention.
FIG. 4B is a graph showing one technique for deriving maximum and minimum luminance, Lmax and Lmin, from luminance, L.

With reference to FIG. 4A, if h is a lowpass filter, Lmax may be obtained by dilating the frame by h (in a block 410) then filtering the dilated frame by h (in a block 420), and Lmin may be obtained by eroding the frame by h (in a block 430) then filtering the eroded frame by h (in a block 440). Those skilled in the pertinent art are familiar with conventional techniques for dilating, eroding and filtering using a spatial filter, including the appropriate scale factor for normalizing the filter.

Those skilled in the pertinent art will also realize that h may be any size or shape. For example, h may be a 5×3 rectangle:

| 1 | 1 | 1 | 1 | 1 |
|---|---|---|---|---|
| 1 | 1 | 1 | 1 | 1 |
| 1 | 1 | 1 | 1 | 1 |

In the illustrated embodiment, h is applied to each pixel of the frame to obtain a value for that pixel having a value that varies less (less high spatial-frequency) from its neighboring pixels than before h was applied. FIG. 4B shows a graph 450 showing an example L, Lmax and Lmin over a frame. It should be noted that L always lies between Lmax and Lmin, which are both blurry.

Returning to FIG. 3, L, Lmax and Lmin are provided to the sub-frame generator 330. In turn, the sub-frame generator 330 employs these to produce a sequence of sub-frames, each having differing levels of spatial-frequency content.

Figure 5:
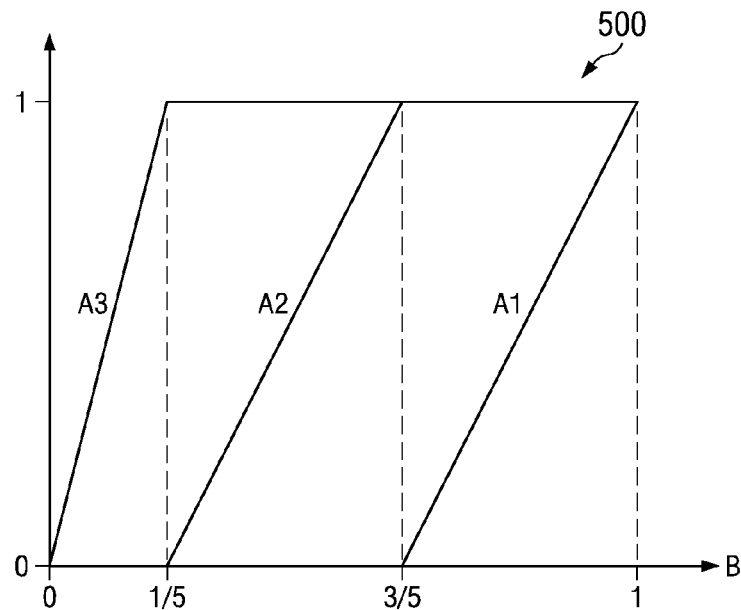
FIG. 5 is a graph illustrating one technique for distributing sharpness among multiple sub-frames carried out according to the principles of the invention.

An example of how the sub-frame generator 330 may be employed to generate five sub-frames from L, Lmax and Lmin and wherein sharpness is distributed in accordance with FIG. 5 will now be described. In the example, the sub-frame generator 330 will take advantage of symmetry: sub-frames 1, 2 and 3 will be unique, and sub-frames 4 and 5 will be duplicates of sub-frames 2 and 1, respectively. The display sequence for these sub-frames is sub-frame 1, followed by sub-frame 2, followed by sub-frame 3, followed by sub-frame 4, followed by sub-frame 5. An initial portion of the display sequence includes sub-frames 1 and 2, and a subsequent portion of the display sequence includes sub-frames 4 and 5.

Thus, sub-frames 1 and 5 will have the lowest spatial-frequency content, and sub-frame 3 will have the highest spatial-frequency content. Sub-frames 2 and 4 are in between in terms of their spatial-frequency content. Lb, the blurry image component, is defined as Lb=Lmin. Ls, the sharp image component, is defined as Ls=L−Lb (since L=Lb+Ls).

B is defined as Lmax−Lmin. In this example, B is employed to determine how much of each component, Lb and Ls, can be placed in each sub-frame. FIG. 5 illustrates what may be called a "waterpouring" technique for allocating Lb and Ls: as much Ls is allocated to sub-frame 3 (the center sub-frame) as possible. Any remaining Ls is allocated to the sub-frame 2 (and sub-frame 4). Lb is allocated only after Ls has been fully allocated. Accordingly, A3=min(1,B×5), which represents the amount of Ls allocated to sub-frame 3. A2=max(0,min(1,(B×5−1)/2)), which represents the amount of Ls allocated to sub-frames 2 (and sub-frame 4). A1=max(0,(B×5−3)/2), which represents the amount of Ls allocated to sub-frames 1 (and sub-frame 5). For allocating Lb, Li=AiLs+(1−Ai)Lb, for i=1, 2, 3.

The above ensures that L=(L1+L2+L3+L4+L5)/5, where L4=L2 and L5=L1. In other words, the original frame is the average of sub-frames 1 through 5.

Returning again to FIG. 3, the sub-frame generator 330 has generated sub-frames based on the luminance information provided it. These sub-frames (five shown in FIG. 3, only three of which being unique) are provided to a luminance/color recombiner 340. The luminance/color recombiner 340 recombines the sub-frames with R', G' and B' produced by the luminance/color separator 310, producing Ri, Gi and Bi, i=1, 2, 3, 4, 5, as follows:

$Ri=R'\times Li$ $Gi = G' \times Li$ $Bi = B' \times Li$

Recalling FIG. 2, the luminance/color recombiner 340 provides Ri, Gi and Bi to the bit plane formatter 230 for transformation into bit planes. In transforming Ri, Gi and Bi, the bit plane formatter 230 may format the bit planes such that each sub-frame cuts or smoothly dissolves to the next.

Figure 6:
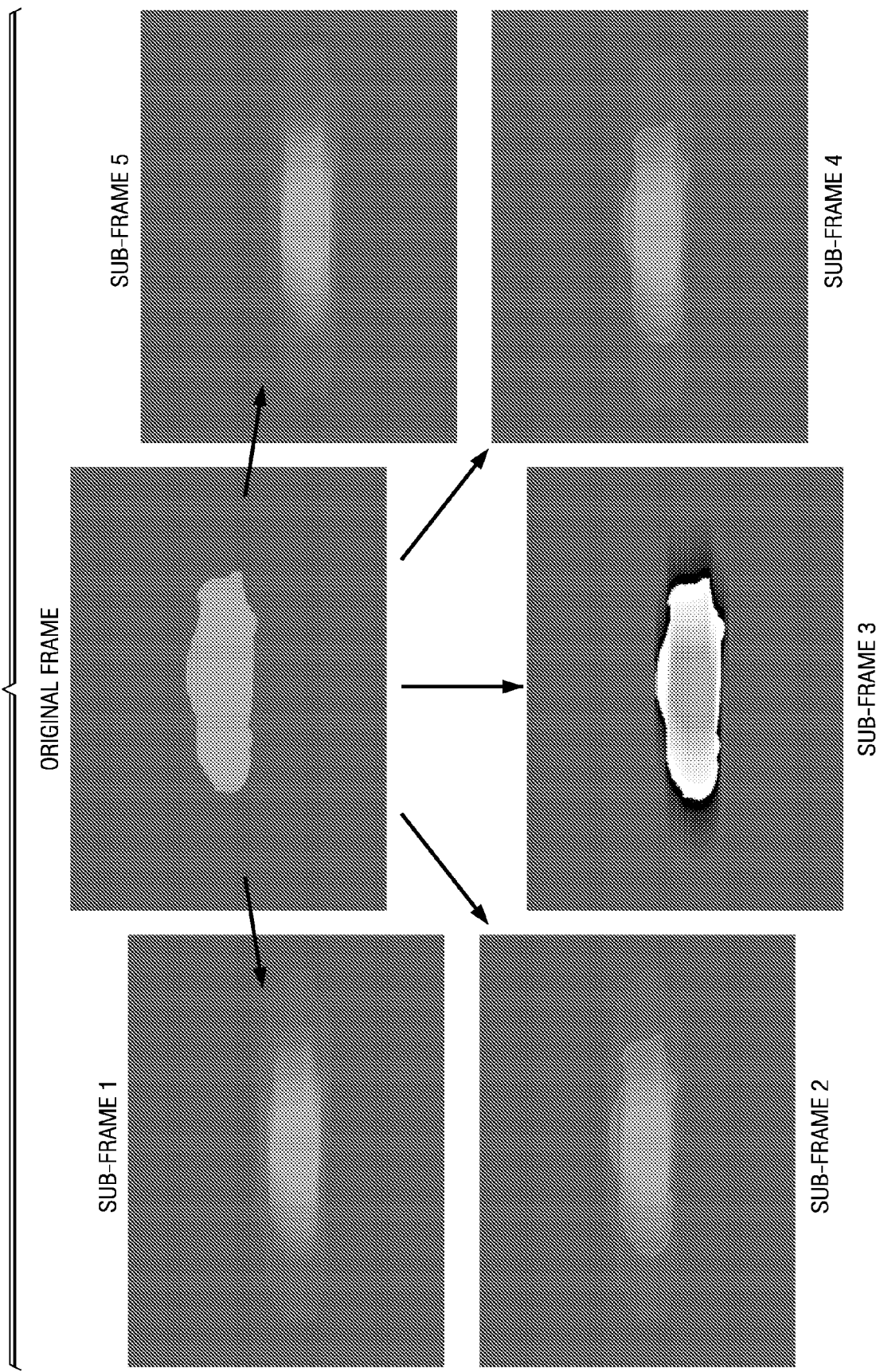
FIG. 6 illustrates an example of five sub-frames generated from a single original frame.

FIG. 6 illustrates an example of five sub-frames generated from a single original frame. Labeled are the original frame and sub-frames 1 through 5. FIG. 6 is presented primarily for the purpose of demonstrating in a visual way the differences among the original frame and sub-frames based thereon.

Figure 7:
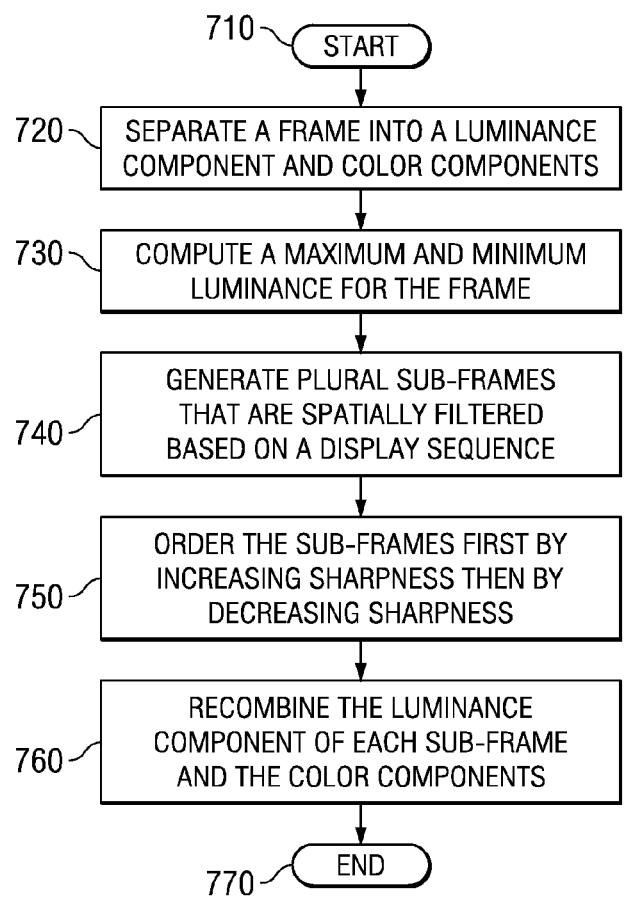
FIG. 7 illustrates a method of improving video image sharpness carried out according to the principles of the invention.

FIG. 7 illustrates a method of improving video image sharpness carried out according to the principles of the invention. Various steps are set forth in FIG. 7 in a certain order. However, that order may change without departing from the scope of the invention.

The method begins in a start step 710. In a step 720, the luminance component and color components of a received frame of a video image are separated from each other. In a step 730, a maximum and minimum luminance is computed for the frame. In a step 740, plural sub-frames are generated from the frame, the sub-frames being spatially filtered with respect to one another based on a display sequence thereof. A water-pouring technique may be employed to allocate a sharp sub-component of luminance to the plural sub-frames. In a step 750, the plural sub-frames are ordered in terms of increasing sharpness during an initial portion of the display sequence and in terms of decreasing sharpness during a subsequent portion of the display sequence. In a step 760, the luminance component and color components of each of the plural sub-frames are recombined, at which point the plural sub-frames may be provided to a bit plane formatter. The method ends in an end step 770.

Although the invention has been described in detail, those skilled in the pertinent art should understand that they can make various changes, substitutions and alterations herein without departing from the scope of the invention in its broadest form.

What is claimed is:

1. A method for generating real-time images from an input video image signal for display by a spatial light modulator video display system, comprising:
   receiving the input video image signal comprising data representing sequential image frames in frame format;
   separating luminance and chrominance components of the received data representing an image frame;
   computing maximum luminance and minimum luminance components from the separated luminance components for the frame using a spatial filter;
   generating a plurality of sub-frames from the frame using the luminance, maximum luminance and minimum luminance components for the frame, the sub-frames having different levels of spatial-frequency content and being ordered in a display sequence with sub-frames having the highest spatial-frequency content being near the center of the sequence, sub-frames having the lowest spatial-frequency content being near the beginning or end of the sequence, and sub-frames having spatial-frequency content between the highest and lowest being between the center and beginning or end of the sequence;
   recombining the luminance and chrominance components of the sub-frames in the ordered display sequence;
   reformatting the ordered display sequence of recombined component subframes into a correspondingly ordered sequence of bit planes; and
   using the correspondingly ordered sequence of bit planes to sequentially set pixels of the spatial light modulator for display of a video image corresponding to the image frame.

2. The method of claim 1, wherein the received data comprises RGB pixel data.

3. The method of claim 2, wherein a luminance/color separator receives and separates the RGB pixel data into the luminance and chrominance components.

4. The method of claim 3, wherein the luminance/color separator produces L luminance and R'G'B' chrominance data components from the RGB data, as follows: L=max(R, G, B), R'=R/L, G'=G/L, and B'=B/L.

5. The method of claim 4, wherein a maximum luminance Lmax and a minimum luminance Lmin are obtained by dilating, eroding and filtering each frame.

6. The method of claim 5, wherein Lmax is obtained by dilating a frame by a lowpass filter h, then filtering the dilated frame by the lowpass filter h; and Lmin is obtained by eroding the frame by the lowpass filter h, then filtering the eroded framed by the lowpass filter h.

7. The method of claim 6, wherein the lowpass filter h is applied to each pixel of the frame to obtain a value for that pixel having a value that has a lower spatial-frequency from neighboring pixels than before the lowpass filter h was applied.

8. The method of claim 5, wherein L, Lmax and Lmin are used by a sub-frame generator to generate the sequence of sub-frames having differing levels of spatial-frequency content.

9. The method of claim 8, wherein a blurry image luminance component is defined as Lb=Lmin, a sharp image luminance component is defined as Ls=L−Lb, and a maximum-minimum luminance difference is defined as B=Lmax−Lmin; a major portion of component Ls is allocated to a central sub-frame; any remaining portion of component Ls is allocated to sub-frames next closest to the central sub-frame; and component Lb is allocated to sub-frames other than the central subframe after the component Ls has been fully allocated; so that the average of the luminance component allocations of all sub-frames is equal to the luminance component of the original frame.

10. The method of claim 9, wherein the allocations of luminance components to the sub-frames is symmetrical about the central sub-frame.

11. The method of claim 8, wherein the generated sub-frames are provided to a luminance/color recombiner which recombines the sub-frames with R', G', B' components produced by the luminance/color separator, producing Ri, Gi, Bi components for each sub-frame i, as follows: $Ri = R' \times Li$, $Gi = G' \times Li$, and $Bi = B' \times Li$, where Li is the luminance component allocated to the sub-frame i.

12. The method of claim 11, wherein a bit plane formatter transforms the Ri, Gi, Bi data and formats the bit planes for smooth image transition from one sub-frame to the next.

* * * * *